United States Patent [19]

Cripps

[11] Patent Number: 4,957,986

[45] Date of Patent: Sep. 18, 1990

[54] PARTIALLY FLUORINATED POLYESTERS FROM KETENE ACETALS AND FLUORINE MONOMERS

[75] Inventor: Harry N. Cripps, Hockessin, Del.

[73] Assignee: E. I. Du Pont de Nemours and Company, Wilmington, Del.

[21] Appl. No.: 451,002

[22] Filed: Dec. 15, 1989

Related U.S. Application Data

[62] Division of Ser. No. 227,139, Aug. 2, 1988.

[51] Int. Cl.$^5$ .................. C08F 14/22; C08F 14/26; C08F 14/28
[52] U.S. Cl. .................. 526/247; 526/249; 526/254; 526/255; 526/266; 526/270; 528/299; 568/607; 568/611; 568/615; 568/626; 568/661; 568/663; 568/677; 568/683; 568/684; 568/812; 568/814; 568/842; 568/850
[58] Field of Search ............... 526/247, 249, 254, 255

[56] References Cited

U.S. PATENT DOCUMENTS 4,304,767  12/1981  Heller et al. .................. 528/392
4,857,620  8/1989  McCollum et al. ............ 526/255

OTHER PUBLICATIONS

Billmeyer, "Textbook of Polymer Science", 1971, pp. 423–426.
Bailey et al., *J. Polymer Science: Polymer Chemistry Edition*, vol. 20, 3021–3030 (1982).
Bailey et al., *Makromol. Chem.*, vol. 183, 1913–1920 (1982).
Bailey et al., *Macromolecules*, vol. 15, 711–714 (1982).
Bailey et al., *J. Macromol. Sci. Chem.*, A21 (8 & 9), 979–995 (1984).

*Primary Examiner*—John Kight, III
*Assistant Examiner*—Frederick Krass

[57] ABSTRACT

Partially fluorinated polyesters are disclosed having increased biodegradability and water repellency. The incorporation of an ester group into the backbone of the partially fluorinated compound permits modification of the compound's physical properties.

7 Claims, No Drawings

PARTIALLY FLUORINATED POLYESTERS FROM KETENE ACETALS AND FLUORINE MONOMERS

This a divisional application of U.S. Ser. No. 227,139 filed on Aug. 2, 1988.

FIELD OF THE INVENTION

This invention concerns partially fluorinated polyesters derived from the free radical initiated reaction of fluorinated olefins with cyclic ketene acetals. The incorporation of an ester group into the backbone of the partially fluorinated polymer permits the modification of physical properties of the resulting polymer to provide such characteristics as increased biodegradability and enhanced water repellancy. The copolymers of this invention are useful as films and fibers and as intermediates in the preparation fluorinated diols.

BACKGROUND OF THE INVENTION

Bailey, et al., J. Polymer Science: Polymer Chemistry Edition, Vol. 20, 3021–3030 (1982), disclose the free radical ring-opening polymerization of 2-methylene-1,3-dioxepane to form poly-ε-caprolactone. Under the same conditions, 2-methylene-1,3-dioxolane and 2-methylene-1,3-dioxane generated polymers with mixed ring-opened and non ring-opened structures. Copolymerization of the dioxepane with vinyl monomers (styrene, 4-vinylanisole, methyl methacrylate or vinyl acetate) in a 1:1 molar ratio gave copolymers which contained less than 50 mol % dioxepane.

Bailey, et al., Makromol. Chem., Vol 183, 1913–1920 (1982), disclose the free radical ring-opening polymerization of 2-methylene-4-phenyl-1,3-dioxolane to produce poly[γ-(β-phenyl)butyrolactone]. Copolymerization of this dioxolane with vinyl monomers (styrene, methyl methacrylate, vinylacetate or 4-vinylpyridine) in a 1:1 molar ratio gave copolymers which contained less than 41 mol % dioxolane.

Bailey, et al., Macromolecules, Vol. 15, 711–714 (1982), disclose the free radical polymerization of cis- and trans-4,7-dimethyl-2-methylene 1,3-dioxepane and 5,6-benzo-2-methylene-1,3-dioxepane to produce the corresponding polyesters. The cis-/transmonomer copolymerizes with 1:1 mixtures of styrene or methyl methacrylate to give copolymers which contain less than 30 mol % dioxepane. The benzo-dioxepane copolymerizes with styrene, 4-vinylanisole or methyl methacrylate to give copolymers which contain less than 33 mol % dioxepane.

Bailey et al., J. Macromol. Sci. Chem., A21(8&9), 979–995 (1984), disclose the hydrolysis of a copolymer of 2-methylene-1,3dioxepane and styrene ($r_1 = 0.021$ and $r_2 = 22.6$) to give an oligomer terminated with a hydroxyl group and a carboxylic acid group. Similarly, hydrolysis of an ethylene/2-methylene-1,3dioxepane copolymer gave a series of ethylene oligomers with 9 to 47 ethylene units which were terminated with a hydroxyl group and a carboxylic acid group. The copolymerization of the dioxepane with vinyl chloride is also disclosed.

The polymers of the present invention can be distinguished from those of the prior art by the alternating structure of the fluoro-olefin/cyclic ketene acetal copolymer. Further, the copolymers of the present invention permit a one step reduction process for the formation of highly fluorinated diols. Conventional syntheses for the fluorinated diols require a tedious multiple step process.

SUMMARY OF THE INVENTION

This invention provides a partially fluorinated polyester of general structure I

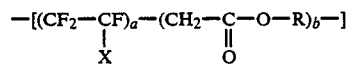

Wherein:
X=F, CF$_3$, Cl, Br, I, OCF$_3$, OCF$_2$CF$_3$, OCF$_2$CF$_2$CF$_3$, OCF$_2$CF(CF$_3$)O(CF$_2$)$_2$CF$_3$;
R=—CHR$^1$—(CH$_2$)$_n$—CHR$^2$—(where n=0–2)

R = —CHR$^1$—(CH$_2$)$_n$—CHR$^2$— (where n = 0–2)

or

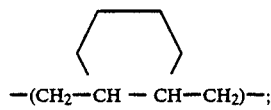

R$^1$ and R$^2$ are independently H, C$_1$–C$_4$ alkyl or phenyl;

The ratio of a/b is about or equal to 1 derived from the free radical initiated copolymerization of a fluorinated olefin, A, CF$_2$=CFX (X defined as above), and a cyclic ketene acetal, B, having the general structure

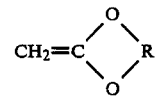

This invention also provides partially fluorinated polyester terpolymers, of general structure II, below, from the free radical initiated copolymerization of a fluorinated olefin, A, a cyclic ketene acetal, B, and an olefin, C

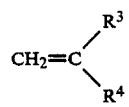

R$^3$=H, C$_1$–C$_4$ alkyl
R$^4$=H, C$_1$–C$_4$ alkyl, C$_1$–C$_4$ alkoxy The terpolymer, II, has the general structure

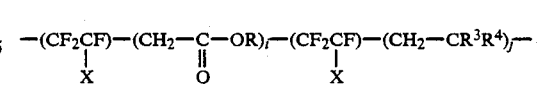

wherein $0.1 \leq i \leq 1.9$ and $i+j=2$ when the olefin, C, tends to alternate with the fluoroolefin and has little or no tendency to copolymerize with B.

This invention also provides partially fluorinated diols of the general structure III by the reduction of the corresponding copolymer, I,

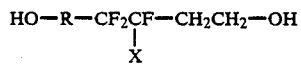

where R and X are as defined above.

This invention also provides diols of the general form IV

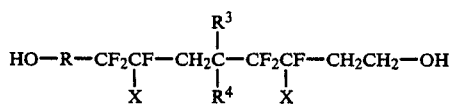

by the reduction of the corresponding terpolymer, II, where R, $R^3$ and $R^4$ are as defined above.

The present invention differs from the prior art by providing a one step process for producing the partially fluorinated structure I from available monomers. Further, an essentially alternating structure with a=b is possible, depending upon the concentration of monomers in the polymer.

DETAILED DESCRIPTION OF THE INVENTION

The copolymers of this invention are partially fluorinated polyesters formed by the free radical initiated reaction of a fluorinated olefin with a cyclic ketene acetal and an optional hydrocarbon olefin.

Suitable fluorinated olefins include tetrafluoroethylene (TFE) and derivatives of TFE in which one fluorine has been replaced by chlorine, bromine, iodine, a perfluoroalkyl or a perfluoroether group. Preferred fluorinated olefins include TFE, chlorotrifluoroethylene (CTFE), hexafluoropropylene (HFP), perfluoromethylvinylether (PMVE) and perfluoropropylvinylether (PPVE).

Suitable cyclic ketene acetals are 5-7 membered ring heterocyclic bisethers, in which the ether oxygens are part of a 2-methylene-1,3-dioxo group. The heterocycle may contain aromatic or lower alkyl substitutents. Examples of suitable cyclic ketene acetals include 2-methylene-1,3dioxolane, 2-methylene-4-phenyl-1,3-dioxolane, 2-methylene-1,3-dioxane, 2-methylene-1,3dioxepane (MDO), 4,7-dimethyl-2-methylene-1,3-dioxepane and 5,6-benzo-2-methylene-1,3-dioxepane. Preferred acetals include MDO and the above dimethyl and benzo derivatives of MDO, most preferably MDO.

The ratio of comonomers in the resultant copolymer or terpolymer will depend on the concentration of monomers in the polymerization medium. This concentration, in turn, will be determined by the amount of monomer charged and the relative solubilities of the monomers in the polymerization medium. Relative solubilities of the monomers may change as the polymerization proceeds.

Copolymerization of approximately equimolar amounts of a suitable fluorinated olefin and a suitable cyclic ketene acetal give an essentially 1:1 alternating copolymer in which the acetal is present predominantly in the ring-opened form. Some acetal-derived dyads may also be present in the polymer. The amount of acetal-derived dyads can be minimized by increasing the fluorinated olefin:acetal ratio. However, large excesses of TFE and CTFE may result in the formation of mixtures of polyfluoroolefin and the 1:1 alternating copolymer. Conversely, excess acetal increases the number of acetal dyads and triads in the copolymer.

Terpolymers can be made by using a third monomer in the polymerization reaction which tends to alternate with the fluoroolefin, but which copolymerizes poorly, if at all, with the ketene acetals. Suitable monomers include an unsubstituted olefin (ethylene) and terminal, alkyl- or alkoxy-substituted olefins such as propylene, isobutylene and ethyl vinyl ether. The terpolymers of this invention vary in character from soft, sticky glasses to clear, brittle glasses.

The copolymers and terpolymers of this invention are useful as films and fibers and as intermediates in the preparation of novel fluorinated diols, which in turn can be used to prepare a variety of fluorinated condensation polymers, such as polyesters and polyurethanes.

All of the monomers used to prepare the copolymers and terpolymers of this invention are known in the art.

Suitable initiators for the free radical polymerization include azobisnitriles and diacyl or dialkyl peroxides. Preferred initiators include 2,2'-azobis(isobutyronitrile), lauroyl peroxide and di-t-butyl peroxide.

The copolymers of this invention can be made by free radical-initiated polymerization in solution. Suitable solvents include alcohols, halogenated hydrocarbons and aromatic solvents. Preferred solvents include t-butyl alcohol, F-113, FC-75 and benzene. When a volatile fluoro-olefin or termonomer is used, the reaction is typically conducted in a sealed vessel at elevated pressures. The pressure is not critical, but should not exceed the safe operating limits of the reaction vessel. The polymerization can be run at 25° C. to 150° C. Above 150° C., dimerization of some of the fluoroolefin monomers, such as TFE and CTFE, may occur. Preferably, the temperature is 50° C. to 130° C. The reaction time is from 0.5 to 16 h; preferably, the reaction time is 4 to 12 h. The product is isolated by filtration or precipitation in a non-solvent. Further purification can be accomplished by redissolving the polymer in a polar solvent, filtering the polymer solution and reprecipitating the polymer in a non-solvent.

The copolymer can be characterized by conventional analytical techniques. $^{19}F$, $^{13}C$ and $^1H$ nmr are particularly useful for determining the monomer sequence.

The copolymers of this invention can be reduced to the corresponding diols by reaction with an appropriate reducing agent, preferably lithium aluminum hydride.

The diols derived from the copolymers of this invention can be reacted with dimethylterephthalate to make polyterephthalates as shown in the following equation:

$HO(CH_2)_4CF_2CFX(CH_2)_2OH$ +

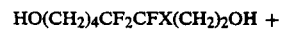

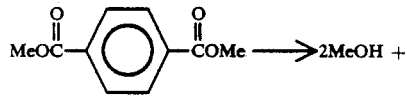

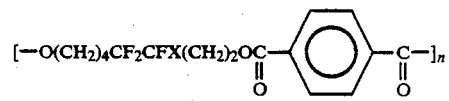

$X=F$, Cl, Br, I, $CF_3$, $OCF_3$, $OC_2F_5$, $O(CF_2)_2FC_3$, $OCF_2CF(CF_3)O(CF_2)_2CF_3$ The procedure used for this reaction is substantially that disclosed by Sorenson et al., [Preparative Methods of Polymer Chemistry, 2nd Edition, 1968, pages 132-33, Interscience Publishers (John Wiley & Sons)], for the formation of poly(1,4-cyclohexanedicarbinyl terephthalate) from 1,4-cyclohexanedicarbinol and dimethyl terephthalate.

EXAMPLE 1

Copolymerization of Tetrafluoroethylene (TFE) and 2-Methylene-1,3-Dioxepane (MDO)

A 240 mL pressure vessel Hastelloy-Shaker tube) was charged sequentially with MDO (18.2g, 0.16 mole) dissolved in nitrogen-saturated t-cutyl alcohol (40 mL) and 2,2'-asobis (isobutyronitrile) (0.06 g, $3.6 \times 10^{-4}$ mole, Vaso ™ 64, DuPont) dissolved in nitrogen-saturated t-butyl alcohol (40 mL). The vessel was closed, cooled in dry ice/acetone bath and evacuated with a mechanical oil pump. The evacuated vessel was placed in a shaking apparatus and TFE (16.0 g, 0.16 mole) added. The vessel was shaken and heated slowly to 76° C. at which time the autogenous pressure was 1524 kPa. After 20 min. at 74°–46° C., the pressure had dropped to to 372 kPa and slowly decreased to 186 kPa over 12 h. The vessel was cooled to 26° C. and the pressure (62 kPa) was bled off. The vessel contained a hard white rubbery solid suspended in t-butyl alcohol. The solid polymer was blended in an Osterizer with ice and water (5×) and then with methanol (2×). The macerated solid was dried under oil pump vacuum for 1 h at room temperature to remove most of the methanol. The solid was then dissolved in 300 mL of hot (ca. 60° C.) tetrahydrofuran (THF) and the hot solution filtered. The filtrate was added slowly to 900 mL of methanol to precipitate the polymer which was then blended with a methanol-dry ice mixture (3×) to homogenize the solid. The solid polymer weighed 27.27 g after drying in a vacuum oven overnight (45° C., 0.1 mm).

Anal. calcd. for[$(CF_2CF_2)(CH_2C(O)O\ (CH_2)_4)$]:C 44.86; H 4.71; F 35.44; O 14.94. Found: C 45.75; H 4.74; F 37.49; 0 15.20 (by difference). This corresponds to a TFE/MDO copolymer which contains 52.3 mol % MDO, based on C.

IR and NMR ($^{19}F$, $^1H$) spectra are also consistent with a substantially 1:1 alternating TFE/MDO copolymer. Comparison of relative NMR peak areas suggests that the copolymer contains 52–53 mol % MDO, including 5.5–7.3 mol % MDO dyads.

This synthesis of TFE/MDO was repeated to give a TFE/MDO copolymer which contained 51.6 mol % MDO. A sample of the copolymer was molded at 150° C. and 2000 psi to give opaque film 30 mils thick. Tensile yield: 2,200 psi. Tensile max: 4,700 psi. Tensile break: 4,600 psi. Elongation max: 468%. Tensile modulus: 42,400 psi.

Molecular weight analysis: $M_n = 19,800$; $M_w = 144,000$; $M_w/M_n = 7.27$. The density of the copolymer is 1.4378 (as determined by density gradient). Inherent viscosity=0.25 g/DL in o-xylene at 90° C. $\eta = 0.509$.

Thermal analysis (differential scanning calorimetry, DSC): $T_m = 95°$ C., first heating; 78.1° C., second heating; $T_g = -28.4°$ C., second heating.

EXAMPLE 2

Copolymerization of TFE and MDO

The pressure vessel used in Example 1 was charged with Vazo ™ 64 (0.075 g, $4.6 \times 10^{-4}$ mole) and MDO (25.0 g, 0.22 mole) dissolved in 100 mL of nitrogen saturated t-butyl alcohol. The vessel was closed, cooled and evacuated as in Example 1 and charged with TFE (26 g, 0.26 mole). The vessel was shaken and warmed slowly to 65° C. at which time the autogenous pressure was 2124 kPa. The vessel was shaken at 62.4°–71.3° C. for 11.75 h, at which time the pressure was 359 kPa (64.4° C.). The vessel was cooled to room temperature and vented. The vessel contained a white solid polymer contaminated with dark specks of thread lubricant from the vessel closure. The product was blended with cold methanol (3×) and weighed 40.17 g after drying.

Analysis of the $^1H$ NMR spectrum indicates that the copolymer contains 52.6 mol % MDO.

EXAMPLE 3

Copolymerization of TFE and MDO

The procedure described in Example 1 was repeated using 0.075 g of Vazo ™ 64, 19.0 g of MDO (0.17 mole), 100 mL of t-butyl alcohol and 15 g of TFE (0.15 mole). The vessel was shaken at 75° C. for 12 h. The precipitated polymer weighed 24.6 g after maceration and drying.

Anal. calcd. for [$(CF_2,CF_2)(CH_2C(O)O\ (CH_2)_4)$]C 44.86; H 4.71; F 35.44; O 14.94. Found: C 45.58; H 4.98; F 34.23. This corresponds to a TFE/MDO copolymer which contains 51.8 mol % MDO, based on C.

A sample of the copolymer was molded at 150° C. and 2000 psi to give opaque film 30 mils thick. Tensile yield: 2,200 psi. Tensile max: 4,000 psi. Tensile break: 3,900 psi. Elongation max: 399%. Tensile modulus: 42,700 psi.

Molecular weight analysis: $M_n = 16,000$; $M_w = 133,000$. $M_w/M_n = 8.31$. The density of the copolymer is 1.4288 (as determined by density gradient). $\eta = 0.457$.

Thermal analysis (differential scanning calorimetry, DSC): $T_m = 94.5°$ C., first heating; 74.31° C., second heating; $T_g = -28.7°$ C., second heating.

EXAMPLE 4

Copolymerization of TFE and MDO

The procedure described in Example 1 was repeated using 0.075 g of Vazo ™ 64, 100 mL of nitrogen-saturated Freon ™ 113 (Dupont), 11.4 g of MDO (0.10 mole) and 11 g of TFE (0.11 mole). The vessel was shaken at 75° C. for 12 h. The dried polymer weighed 18.60 g.

Anal. calcd. for [$(CF_2CF_2)(CH_2C(O)O\ (CH_2)_4)$]: C 44.87; H 4.71; F 35.48; O 14.94. Found: C 44.80; H 4.82; F 32.42. This corresponds to a TFE/MDO copolymer which contains 49.8 mol % MDO, based on C.

A sample of the copolymer was molded at 150° C. and 2000 psi to give opaque film 30 mils thick. Tensile yield: 2,200 psi. Tensile max: 4,800 psi. Tensile break: 4,800 psi. Elongation max: 411%. Tensile modulus: 44,100 psi.

Molecular weight analysis: $M_n = 23,100$; $M_w = 128,200$. $M_w/M_n = 5.55$. The density of the copolymer is 1.4487 (as determined by density gradient). $\eta = 0.481$.

Thermal analysis (differential scanning calorimetry, DSC): $T_m = 99.9°$ C., first heating; 80.9° C., second heating; $T_g = -28.9°$ C., second heating.

EXAMPLE 5

Copolymerization of TFE and MDO

The procedure described in Example 1 was repeated using 0.05 g of Vazo ™ 64, 100 mL of Freon ™ 113, 5.7 g of MDO (0.05 mole) and 30 g of TFE (0.30 mole). The vessel was heated under autogenous pressure at 65° C. for 1 h and at 75° C. for 12 h. The product was isolated as described in Example 3 and weighed 23.67 g.

Extraction of the product with hot THF (200 mL), followed by precipitation of the polymer in methanol gave a polymer which weighed 4.17 g after drying.

Anal. calcd. for [(CF$_2$CF$_2$)(CH$_2$C (O)O(CH$_2$)$_4$)]: C 44.86; H 4.71; F 35.44; O 14.94. Found: C 44.70; H 4.50; F 37.20. This corresponds to a TFE/MDO copolymer which contains 47.96 mol % MDO, based on C.

The THF-insoluble residue weighed 7.73 g after drying. Elemental analysis confirmed that this residue is essentially pure polytetrafluoroethylene.

EXAMPLE 6

Copolymerization of MDO and TFE

The procedure described in Example 1 was repeated using Vazo ™ 64 (0.070 g), benzene (100 mL), MDO (19.0 g, 0.017 mol) and TFE (20.0 g, 0.20 mol). The polymerization was conducted under autogenous pressure at 65° C. for 6 h. The product separated into two layers. The upper layer (105.2 g) contained benzene (94.05%) and MDO (5.13%), as analyzed by GC. The lower layer was added to methanol (500 mL) to give a solid polymer which weighed 4.32 g after drying.

EXAMPLE 7

Copolymerization of MDO and TFE

The procedure described in Example 1 was repeated using Vazo ™ 64 (0.05 g), FC 75 ™ (100 mL, fluorinated solvent commercially available from the 3M Company), MDO (11.4 g, 0.10 mol), TFE (12 g, 0.12 mol). The polymerization was conducted under autogenous pressure at 65° C. for 15 h. The dry solid polymer weighed 5.25 g.

EXAMPLE 8

Copolymerization of MDO and TFE

The procedure described in Example 1 was repeated using lauroyl peroxide (0.05 g, Lucidol ™, Pennwalt), t-butyl alcohol (100 mL), MDO (19 g, 0.17 mol) and TFE (20.0 g, 0.20 mol). The polymerization was conducted under autogenous pressure at 65° C. for 3 h. The dry solid polymer weighed 17.9 g.

EXAMPLE 9

Copolymerization of MDO and TFE

The procedure described in Example 1 was repeated using di-t-butyl peroxide (0.10 g), t-butyl alcohol (100 mL), MDO (11.4 g, 0.10 mol) and TFE (12.0 g, 0.12 mol). The reaction mixture was heated under autogenous pressure at 120° C. for 14 h. The solid polymer weighed 15.77 g after drying.

EXAMPLE 10

Copolymerization of MDO and Hexafluoropropylene (HFP)

The vessel described in Example 1 was charged as described above with 0.075 of Vazo ™ 64, 11.4 g MDO, 100 mL of nitrogen-saturated t-butyl alcohol and 15.0 g of HFP. The vessel was shaken and heated to 75° C. at which time the autogenous pressure was 696 kPa. After the vessel was shaken at 73°-75° C. for 12 h, the pressure had dropped to 359 kPa. The vessel was cooled to room temperature and vented. The resulting liquid and white solid were blended with dry ice and methanol (3×). On warming, the solid was very sticky. The solid was dissolved in methylene chloride and slowly poured into dry ice/methanol. The cold solid was put in a jar and dried for 2 days. The resultant polymer was a clear tough gum which weighed 15.61 g.

Anal. calcd. for [(CF$_2$C(CF$_3$)F)(CH$_2$C (O)O(CH$_2$)$_4$)]: C 40.92; H 3.82; F 43.15; O 12.11. Found: C 43.20; H 4.34; F 39.34. This corresponds to a HFP/MDO copolymer which contains 55.85 mol % MDO, based on C. $^1$H NMR analysis is consistent with an HFP/MDO copolymer which contains 53.4–54.9 mol % MDO and 13–18% MDO-dyads.

IR(cm$^{-1}$): 2960, 1740, 1200.

The polymer is amorphous and has a T$_g$ at −24.3° C. Thermal gravimetric analysis (TGA) in air: Onset of decomposition =377.7° C.; Maximum Rate at 399.9° C.

Molecular weight analysis: M$_n$=14,000: M$_w$=53,800. M$_w$/M$_n$=3.85. $\eta$=0.252 DL/g.

EXAMPLE 11

Copolymerization of MDO and Chlorotrifluoroethylene (CTFE)

The procedure described in Example 2 was repeated using 0.075 g of Vazo ™ 64, 100 mL of t-butyl alcohol, 11.4 g of MDO (0.10 mole) and 13.0 g of CTFE (0.11 mole). The vessel was shaken at 75° C. for 12 h under autogenous pressure. The dried solid polymer weighed 20.03 g.

The product presses to a soft, rubbery film at 120°-150° C., and is soluble in THF.

Anal. calcd. for [(CF$_2$CFCl)(CH$_2$C(O)O (CH$_2$)$_4$)]: C 41.66; H 4.37; Cl 15.37; F 24.72; O 13.88. Found: C 42.35; H 4.58; Cl 14.91; F 24.56. This corresponds to a CTFE/MDO copolymer which contains 53.6 mol % MDO, based on C. $^1$H NMR analysis is consistent with a 1:1 alternating CTFE/MDO copolymer.

Molecular weight analysis: M$_n$=30,200; M$_w$=121,000. M$_w$/M$_n$=4.01.

Thermal analysis (differential scanning calorimetry, DSC): T$_m$=70.2° C., first heating; T$_g$=−14 ° C., second heating.

EXAMPLE 12

Copolymerization of MDO and Perfluoropropylvinyl ether (PPVE)

The procedure described in Example 2 was repeated using 0.075 g of Vazo ™ 64, 100 mL of t-butyl alcohol, 11.4 g of MDO (0.10 mole) and 28 g of PPVE (0.105 mole). The vessel was shaken at 75° C. for 12 h under autogenous pressure. The isolated polymer is a soft, sticky gum which is soluble in THF and methylene chloride. It weighed 10.13 g after drying.

Anal. calcd. for [(CF$_2$CF (OCF$_2$CF$_2$CF$_2$CF$_3$)(CH$_2$-C(O)O(CH$_2$)$_4$)]:1 )]C 34.75; H 2.65; F 49.98; O 12.62. Found: C 35.08; H 2.85; F 48.70. This corresponds to a PPVE/MDO copolymer which contains 51.0 mol % MDO, based on C. The $^1$H NMR spectrum was in accord with an essentially 1:1 alternating PPVE/MDO copolymer.

Molecular weight analysis: M$_n$=8,830; M$_w$=14,300. M$_w$/M$_n$=1.62.

EXAMPLE 13

Copolymerization of MDO, TFE and Isobutylene (IB)

The procedure described in Example 1 was repeated using 0.10 g of Vazo ™ 64 (6×10$^{-4}$ mole), 16.3 g of MDO (0.143 mole), 100 mL of t-butyl alcohol, 8.0 g of IB (0.143 mole) and 28.6 g of TFE (0.286 mole). The vessel was shaken under autogenous pressure at 70°-78°

C. for 12 h. (Except for an exotherm at 70° C., the reaction was run at 74°-75° C.) The crude reaction product, a soft polymer, was blended with ice water and methanol. After soaking overnight in methanol, the polymer was filtered off. The polymer was dissolved in methylene chloride, reprecipitated in a large excess of methanol and dried in a vacuum oven to give a clear, hard gum (28.2 g).

Elemental analysis. Found: C 43.00; H 4.86; F 42.28. This corresponds to a TFE/MDO/IB copolymer of 1/0.554/0.295 (i.e., TFE=54.1, MDO=29.6, IB=15.95 mole %).

$^1$H NMR analysis gives a TFE/MDO/IB ratio of 1/0.32/0.37 (i.e., TFE=59.1, MDO=19.1, IB=21.9 mole %). The polymer consists primarily of TFE/IB units, followed by TFE/MDO units, with appreciable amounts (ca. 20%) of TFE/IB/IB units. Some MDO dyads (5.7% of the MDO)and IB dyads (11.8% of the IB) are also present.

Molecular weight analysis: $M_n$=12,000; $M_w$=35,100. $M_w/M_n$=2.92.

Thermal analysis, differential scanning calorimetry DSC): $T_m$=41.4° C., first heating; $T_g$=−13.8° C., second heating. TGA in air: Onset of decomposition=380.7° C.; Maximum rate of decomposition=407.1° C.

EXAMPLE 14

Copolymerization of MDO, TFE and IB

The procedure described in Example 1 was repeated using 0.10 g of Vazo TM 64 (6×10$^{-4}$ mole), 7.7 g of MDO (0.067 mole), 100 mL of t-butyl alcohol, 13.0 g of IB (0.23 mole) and 30 g of TFE (0.30 mole). The vessel was shaken at 73°-76° C. for 12 h. Crude product was isolated by blending first with ice water, then methanol and finally filtering off the solid. After drying in a vacuum oven, the white, rubbery polymer weighed 24.14 g. This solid was dissolved in toluene and the solution filtered to remove traces of insoluble material. Evaporation of the toluene gave 21.49 g of soft polymer.

Elemental analysis. Found: C 44.60; H 5.09; F 45.00. This corresponds to a TFE/MDO/IB copolymer of 1/0.283/0.681 (i.e., TFE=50.9, MDO=14.4, IB=34.7 mole %).

$^1$H NMR analysis gives a TFE/MDO/IB ratio of 1/0.23/0.91 (i.e., TFE=46.7, MDO=10.7, IB=42.5 mole %). Molecular weight analysis: $M_n$=9,980; $M_w$=23,100. $M_w/M_n$=2.31.

Thermal analysis, differential scanning calorimetry DSC): $T_m$=70.7° C., first heating; $T_g$=4.1° C., second heating. TGA: Onset of decomposition=384.6° C.; Maximum rate of decomposition=420.6° C.

EXAMPLE 15

Copolymerization of MDO, TFE and IB

The procedure described in Example 10 was repeated using 0.13 g of Vazo TM 64 (7.8×10$^{-4}$ mole), 8.6 g of MDO (0.074 mole), 100 mL of t-butyl alcohol, 18.0 g of IB (0.32 mole) and 40.0 g of TFE (0.40 mole). The vessel was shaken at 73°-75° C. for 19 h. After work-up, 32.65 g of polymer was isolated.

Elemental analysis. Found: C 45.94; H 5.33; F 44.62.

$^1$H NMR analysis gives a TFE/MDO/IB ratio of 1/0.66/0.93 (i.e., TFE=38.5, MDO=25.6, IB=35.8 mole %).

Molecular weight analysis: $M_n$=10,100; $M_w$=27,900. $M_w/M_n$=2.76. Density: 1.3945.

Thermal analysis, differential scanning calorimetry DSC): $T_m$=81.1° C., first heating; $T_g$=8.5° C., second heating. TGA in air: Onset of decomposition=381.9° C.; Maximum rate of decomposition=429.3° C.

A sample of the copolymer was pressed at 150° C. to give a clear, soft film. Tensile yield: 1,000 psi. Tensile max: 1,200 psi. Tensile break: 1,200 psi. Elongation max: 270%. Tensile modulus: 20,900 psi.

EXAMPLE 16

Copolymerization of MDO and Perfluoromethylvinyl Ether (PMVE)

The procedure described in Example 2 was repeated using Vazo TM 64 (0.075 g), t-butyl alcohol (100 mL), MDO (17.1 g, 0.15 mol) and PMVE (37 g, 0.22 mol). The reaction mixture was heated to 65° C. for 10 h under autogenous pressure. The isolated polymer was a soft gum which weighed 30.65 g after drying. The polymer is soluble in THF and chloroform.

Elemental Analysis. Calc'd for a 1:1 copolymer, $C_9H_{10}F_6O_3$: C3858; H 3.59; F 40.69. Found: C 39.65, 39.92; H 3.62, 3.92; F 43.55, 43.74.

The $T_g$ is between −28° C. and −24° C.

$^1$H nmr (ppm, CDCl$_3$ solvent, TMS ref.): 4.18 (t, 2, —O—CHHD 2—(CH$_2$)$_3$—); 3.08 (d, 2, —CHHD 2—C-(O)O—); 2.05 (m, 2, —CHHD 2—CF$_2$—); 1.70 (m, 4, —CH$_2$—(cHHD 2)$_2$—CH$_2$—).

EXAMPLE 17

Copolymerization of MDO and Perfluoro-2-methyl-3-oxahexylvinyl Ether

A mixture of Vazo TM 64 (0.04 g), anhydrous potassium carbonate (0.05 g), t-butyl alcohol (25 mL) perfluoro-2-methyl-3-oxahexylvinyl ether (24.46 g, 0.061 mol) and MDO (4.5 g, 0.039 mol) was stirred and heated at about 58° C. under autogenous pressure for about 18 h. The reaction mixture became more viscous during this period. The reaction mixture was freed of excess perfluoroether, t-butyl alcohol and other volatiles by vacuum distillation at 25°-72° C. at 760–1.7 Torr. The distillation residue (9.56 g) was extracted with methylene chloride (5×25 mL). The desired product, a methylene chloride-insoluble clear gum, weighed 8.71 g after drying.

Elemental Analysis: Calc'd for $C_{14}H_{10}F_{16}O_4$: C 30.79; H 1.85; F 55.65. Found: C 31.17, 31.10; H 1.96, 1.89; F 55.64, 55.60.

$^1$H nmr (ppm, CDCl$_3$/F113, TMS ref.): 4.2 (t, 2, —O—CHHD 2—(CH$_2$)$_2$—) 3.2 (m, 2, —(CH$_2$-)$_2$—CHHD 2—CF$_2$—); 2.1 (d, 2, —>CF—CHHD 2—O—);H —O—); 1.6 (m, 4,—(CHHD 2)$_2$—CH$_2$—CF$_2$—).

Mw=101,000; Mw/Mn=9.21. (Determined by GPC in hexafluoroisopropanol using polyethylene terephthalate standards.)

EXAMPLE 18

Reduction of TFE/MDO Copolymer to 3,3,4,4-Tetrafluorooctane-1,8-diol

A solution of TFE/MDO copolymer, I, (42.8 g), prepared as in Example 2 was dissolved in tetrahydrofuran (THF, 435 mL) and added to a mixture of 1M lithium aluminum hydride (in THF, 150 mL) and anhydrous THF (150 mL) over 1.5 h. After stirring overnight at ambient temperature, the cloudy reaction mixture was decomposed by sequential addition of water (6.0 mL), 15% aqueous sodium hydroxide (6.0 mL) and water (18.0 mL). The precipitated salts were removed by filtration and washed with THF (3×50 mL). The combined filtrate solutions were dried with anhydrous sodium sulfate (130 g). The solids were removed by filtration and the THF distilled off under vacuum to give crude 3,3,4,4-tetrafluorooctane-1,8-diol (41.8 g). The crude product was distilled through a short path distillation apparatus. The fraction collected at a bath temperature of about 98°–124° C. at ca. 0.065 Torr weighed 29.8 g and solidified on standing (m.p. 52°–55° C.).

Elemental Analysis. Calcd for $C_8H_{14}F_4O_2$: 44.64, C; 6.47, H; 34.83, F. Found: 44.53, 44.40, C; 6.84, 6.63, H; 34.57, F.

IR (cm$^{-1}$) : 3338 (OH), about 1200 (CF). No absorption at 1740 (COOR).

$^1$H NMR (ppm rel. to TMS; CDCl$_3$ solvent): 3.9 (2, HOCH$_2$CH$_2$CF$_2$—); 3.65 (2,HOCHHD 2(CH$_2$)$_2$CH$_2$CF$_2$—); 2.3 (2HOCH$_2$(CH$_2$)$_2$—CHHD 2CF$_2$—); ca.2 (4,HOCHHD 2(CHHD 2)$_2$CH$_2$CF$_2$—); ca. 2 (4, —OH and HOCH$_2$CHHD 2CF$_2$—).

$^{19}$F NMR (ppm rel. to F11; CDCl$_3$ solvent): −114.6 (multi); −116 (multi).

EXAMPLE 19

Reduction of PMVE/MDO Copolymer to 3,4,4-Trifluoro-3-trifluoromethoxy-1,8-octanediol A solution of PMVE/MDO copolymer (63.73 g) in THF (300 mL) was added over a 2 h period to 170 mL of a 1M solution of LiAlH$_4$ in THF at 35°–40° C. After standing overnight at ambient temperature, the reaction mixture was decomposed by sequential addition of water (7 mL), 15% aqueous sodium hydroxide (7 mL) and water (21 mL). The THF solution was filtered and dried with anhydrous sodium sulfate (200 g). The THF was removed by distillation and the pale yellow liquid residue (56.1 g) was distilled through a short path distillation apparatus. A center fraction (39.4 g) was collected at a bath temperature of 75°–78° C. at 0.05 Torr and was the desired diol.

Elemental Analysis: Calc'd for $C_9H_{14}F_6O_3$: C 38.04; H 4.97; F 40.11. Found: C 39.88, 39.76; H 5.38, 5.54; F 39.85.

IR (cm$^{-1}$): 3338 (strong, OH); 1200 (strong, CF). No absorption at 1740 (CO).

EXAMPLE 20

Reduction of PPVE/MDO Copolymer to 3,4,4-Trifluoro-3-perfluoro-1-propoxyoctane-1,8-diol PPVE/MDO copolymer (155.2 g), prepared as in Example 12, was dissolved in 1 L of anhydrous THF and the resulting solution added over about 3.5 h to 300 mL of a 1M solution of lithium aluminum hydride in THF at 21°–40° C. The resultant slightly turbid solution was stirred (ca 18 h) at ambient temperature. The reaction mixture was treated sequentially water (11.5 ml), 15% aqueous sodium hydroxide (11.5 mL) and water (34.5 mL). The salts were removed by filtration and the filtrate dried with anhydrous sodium sulfate (200 mL). The mixture was filtered and the filtrate concentrated to give 149.9 g of liquid which was then distilled through a short path distillation column (Kugelrohr) under reduced pressure. A central fraction was collected at an air bath temperature of 88°–107° C. at 0.075 Torr and weighed 93.8 g. Elemental and spectroscopic analysis was consistent with diol structure II.

Elemental analysis: Calcd. for $C_{11}H_{14}F_{10}O_3$: 34.39, C; 3.67, H; 49.45, F. Found: 35.29, 35.46, C; 4.04, 3.90, H; 47.94, 48.03, F.

IR (cm$^{-1}$): 3338 (OH), ca. 1200 (CF). No absorption was observed at 1740 (COOMe).

$^1$H NMR (ppm rel to TMS, CDCl$_3$ solvent): ca. 4 (4, HOCH$_2$CHHD 2CF<); 3.9 (2,HOCHHD 2CH$_2$CF<); 3.65 (2, HOCHHD 2(CH$_2$)$_2$CH$_2$CF$_2$—); 2.30 (2, HOCH$_2$(CH$_2$)CH$_2$CF$_2$—); 1.62 (4, HOCH$_2$(CH$_2$)$_2$CH$_2$CF$_2$—).

EXAMPLE 21

Reduction of HFP/MDO Copolymer to 3,4,4-Trifluoro-3-trifluoromethyl-1,8-octanediol HFP/MDO copolymer (12.5 g, prepared as in Example 10) was dissolved in anhydrous THF (125 mL) and added to a stirred mixture of 30 mL of 1M lithium aluminum hydride/THF and 75 mL of anhydrous THF at 35°–40° C. After the addition was complete the turbid reaction mixture was stirred for ca. 16 h at ambient temperature. The mixture was treated sequentially with water (1.3 mL), 15% aqueous sodium hydroxide (1.3 mL) and water (4.0 mL). The THF was removed in vacuo and the residue distilled through a short path distillation column under reduced pressure. Two fractions were collected at a bath temperature of 85°–98° C., 0.04–0.05 Torr.

Elemental Analysis: Calcd. for $C_9H_{14}F_6O_2$; C 40.31; H 5.26; F 42.50. Found: (Cut 1) C 41.35, 41.66; H 5.38, 5.41; F 38.55, 39.04; (Cut 2) C 40.56, 40.60; H 5.13, 5.32; F 42.47, 42.77.

IR (cm$^{-1}$): 3338 (OH), ca. 1200 (CF).

$^1$H NMR (ppm rel. to TMS, CDCl$_3$ solvent) 3.9 (2, HOCH$_2$CHHD 2—); 3.7 (2, HOCHHD 2(CH$_2$)$_3$—); 2.35 (2, —CHHD 2CF$_2$—); ca. 2.1 (4, HO— and —CF—CHHD 2—); 1.65 (4, —(CHHD 2)$_2$—).

EXAMPLES 22–27

Polyterephthalates from 3,4,4-Trifluoro-3-perfluoro-1-propoxy-octane-1,8-diol

A mixture of Sb$_2$O$_3$ (0.012 g), a(OAc)$_2$•H$_2$O (0.050 g), octane-1,8-diol (8.45 g, 0.022 mol) and dimethyl terephthalate (3.88 g, 0.02 mol) was charged into a small round bottomed flask surmounted by a short distillation head. The mixture was purged of air by evacuation and flushing with argon (3×). The mixture was melted by immersion in an oil bath at about 150° C. and a capillary was inserted into the molten mixture. The temperature was raised to 200° C. with a slow stream of argon flowing through the capillary. After 1 h at 200° C., the temperature was raised to 250° C. for about 1.2 h, at which time the evolution of the methanol had ceased. The capillary was removed. The melt was then heated from 250°–276° C. over about 2.3 h as the pressure was reduced from 1 atm to about 0.85 Torr. The melt was cooled and the reaction flask removed from the short still and attached to a short path still. The polymerization was finished at 272°–305° C. (air bath temperature) under 0.15–0.04 Torr. The melt was cooled and removed by breaking the flask. The terephthalate polymer was a light brown elastic gum which weighed 7.42 g.

The polymer is soluble in methylene chloride, 1,1,2-trichloroethane, N,N-dimethyl acetamide and chlorobenzene. The polymer is amorphous and has a glass transition around 6° C., as measured by differential scanning calorimetry.

Essentially the same procedure was used to prepare polyterephthalates from the diols HO—(CH$_2$)$_4$—CF$_2$—CFX—(CH$_2$)$_2$—OH (X=F, CF$_3$) and copolymers of the diols (=O(CF$_2$)$_2$CF$_3$, CF$_3$) with octane diol. Polyoctylene terephthalate was also made from 1,8-octane diol. Data on these polymers is summarized in the following Table.

$$+OC-\langle\bigcirc\rangle-CO-O-(CH_2)_4-CX_2-CX+(CH_2)_2-O+$$
$$\quad\quad\quad\quad\quad\quad\quad\quad\quad\quad\quad\quad\quad\quad |$$
$$\quad\quad\quad\quad\quad\quad\quad\quad\quad\quad\quad\quad\quad\quad Y$$

| Ex. | X | Y | Mole % | Tm Onset | Tm Max °C. | Tg | Product | GPC ⊕ Mw | Mn |
|---|---|---|---|---|---|---|---|---|---|
| 22 | H | H | 100 | 127.5 | 135.8 | * | White Crystalline Plastic | 22,200 21,800 | 2.42 2.61 |
| 23 | F | F | 100 | 146.5 | 155.5 | * | Tan Crystalline Plastic | 17,700 17,800 | 3.44 3.69 |
| 24 | F | CF$_3$ | 100 | + | + | 6 | Tan Amorphous | 10,700 11,100 | 3.20 3.15 |
| 25 | H F | H CF$_3$ | 80 20 | 104.3 | 114.5 | * | White Crystalline Plastic | 9,500 10,300 | 2.87 2.53 |
| 26 | F | ** | 100 | + | + | 6 | Tan Amorphous | 14,800 14,400 | 2.18 2.45 |
| 27 | H F | H ** | 80 20 | + | + | 36 | White Crystalline Plastic | 6,700 6,300 | 2.93 2.85 |

\* No Tg observed in two heats DSC
+ No Tm observed DSC
⊕ 0.1% Hexafluoroisopropanol with polyethylene terephthalate standards
\*\* O(CF$_2$)$_2$CF$_3$
Starting Materials (On Next Page)

Starting Materials 22. 8.04 g 1,8-octanediol (0.055 m); 9.71 g DMT (0.05 m); 0.015 g (isopropyl)$_4$Ti catalyst 23. 11.45 g (HO(CH$_2$)$_4$—CF$_2$—CF$_2$(CH$_2$)$_2$OH (0.052 m); 9.71 g DMT (0.005m); 0.020 g (isopropyl) Ti catalyst

24.

$$20.65\text{ g HO(CH}_2)_4-CF_2-CF+(CH_2)_2OH$$
$$\quad\quad\quad\quad\quad\quad\quad\quad\quad\quad\quad |$$
$$\quad\quad\quad\quad\quad\quad\quad\quad\quad\quad\quad CF_3$$

(0.077 m); 13.59 g DMT (0.070 m); 0.020 g (isopropyl)$_4$Ti catalyst

25.

$$3.49\text{ g HO(CH}_2)_4-CF_2-CF(CH_2)_2OH\ (0.013\text{ m});$$
$$\quad\quad\quad\quad\quad\quad\quad\quad\quad\quad |$$
$$\quad\quad\quad\quad\quad\quad\quad\quad\quad\quad CF_3$$

12.63 g DMT (0.065 m); 7.98 g 1,8-octane diol (0.055 m); 0.10 g PbO catalyst;

26.

$$8.45\text{ g HO(CH}_2)_4-CF_2-CF+(CH_3)_3OH\ (0.022\text{ m});$$
$$\quad\quad\quad\quad\quad\quad\quad\quad\quad\quad\quad |$$
$$\quad\quad\quad\quad\quad\quad\quad\quad\quad\quad\quad O(CH_2)_2Cl_3$$

3.88 g DMT (0.020 m); 0.012 Sb$_2$O$_3$ Catalyst 0.050 Cu-(OAc)$_2$•H$_2$O

27.

$$5.00\text{ g HO(CH}_2)_4-CF_2-CF+(CH_2)_2OH\ (0.013\text{ m})$$
$$\quad\quad\quad\quad\quad\quad\quad\quad\quad\quad |$$
$$\quad\quad\quad\quad\quad\quad\quad\quad\quad\quad O(CF_2)_2Cl_3$$

7.98 g 1,8-octanediol (0.055 m) 12.62 DMT (0.065 m); 0.025 g (isopropyl)$_4$Ti catalyst Although preferred embodiments of the invention have been illustrated and described in examples 1 through 27, it is to be understood that there is no intent to limit the invention to the precise constructions herein described. Rather it is to be understood that the right is reserved to all modifications and changes coming within the scope of the invention as defined by the appended claims.

What is claimed is:

1. A partially fluorinated polyester terpolymer of the formula:

$$-(CF_2CF)-(CH_2-\underset{\underset{O}{\|}}{C}-OR)_i-(CF_2CF)-(CH_2-CR^3R^4)_j-;$$
$$\quad\quad |\quad\quad\quad\quad\quad\quad\quad\quad\quad\quad\quad\quad\quad |$$
$$\quad\quad X\quad\quad\quad\quad\quad\quad\quad\quad\quad\quad\quad\quad\quad X$$

wherein
X=F, CF$_3$, Cl, Br, I, OCF$_3$, OCF$_2$CF$_3$, OCF$_2$CF$_2$CF$_3$, or OCF$_2$CF(CF$_3$)O(CF$_2$)$_2$CF$_3$;
R=≦(CHR$^1$(CH$_2$)$_n$CHR$^2$)—(where n = 0–2) or —(CH$_2$—CH — CH—CH$_2$)—
$$\langle\bigcirc\rangle$$

R$^1$ and R$^2$ are independently H, C$_1$-C$_4$ alkyl or phenyl
R$^3$ =H, C$_1$-C$_4$ alkyl
R$^4$ =H, C$_1$-C$_4$ alkyl, C$_1$-C$_4$ alkoxy
0.1≦i ≦1.9 and i=J=2.

2. The partially fluorinated polyester terpolymer of claim 1 where R=—(CHR$^1$(CH$_2$)$_n$CHR$^2$)—(where N=0–2) and where R$^1$ and R$^2$ are each either H or Me.

3. The partially fluorinated polyester terpolymer of claim 2 where R=—(CHR$^1$(CH$_2$)$_2$CH$_2$R$^2$)—.

4. The partially fluorinated polyester terpolymer of claim 3 where R=—(CH$_2$)$_4$—.

5. The partially fluorinated polyester terpolymer of claim 4 where X=F, Cl, CF$_3$, —OCF$_3$, —OCF$_2$CF$_2$CF$_3$ or —OCF$_2$CF(CF$_3$)—O—(CF$_2$)$_2$CF$_3$.

6. The partially fluorinated polyester terpolymer of claim 5 where R$^3$=H and R$^4$=H, CH$_3$ or —OC$_2$H$_5$.

7. The partially fluorinated polyester terpolymer of claim 5 where R$^3$ and R$^4$=CH$_3$.

* * * * *